(12) United States Patent
Ohashi

(10) Patent No.: US 10,705,392 B2
(45) Date of Patent: Jul. 7, 2020

(54) DISPLAY DEVICE

(71) Applicant: SHARP KABUSHIKI KAISHA, Sakai, Osaka (JP)

(72) Inventor: Masayuki Ohashi, Sakai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/470,012

(22) PCT Filed: Jan. 11, 2018

(86) PCT No.: PCT/JP2018/000429
§ 371 (c)(1),
(2) Date: Jun. 14, 2019

(87) PCT Pub. No.: WO2018/135362
PCT Pub. Date: Jul. 26, 2018

(65) Prior Publication Data
US 2020/0103691 A1    Apr. 2, 2020

(30) Foreign Application Priority Data

Jan. 18, 2017   (JP) ................. 2017-006489

(51) Int. Cl.
*G02F 1/1345*   (2006.01)
*G02F 1/1333*   (2006.01)
(Continued)

(52) U.S. Cl.
CPC .......... *G02F 1/13452* (2013.01); *G06F 3/041* (2013.01); *G02B 6/0083* (2013.01);
(Continued)

(58) Field of Classification Search
CPC ............... G02F 1/1336; G02F 1/13452; G02F 1/13454; G02F 1/13458; G02F 1/1333; G02F 1/1345; G02F 1/133308; G02F 1/13338; G02F 1/133615; G02F 1/133305; G02F 1/133603; G02F 1/134309;
(Continued)

(56) References Cited

U.S. PATENT DOCUMENTS

2006/0119761 A1*  6/2006  Okuda ................ G02F 1/13452
                                                        349/58

FOREIGN PATENT DOCUMENTS

JP    H06-059270 A    3/1994

* cited by examiner

*Primary Examiner* — Thoi V Duong
(74) *Attorney, Agent, or Firm* — ScienBiziP, P.C.

(57) ABSTRACT

A display device includes a display panel, a functional unit internally or exteriorly installed in the display panel, a first flexible substrate and connected to one end part of the display panel, a signal-transmission substrate connected to another end part of the first flexible substrate and configured to transmit a driving signal to the first flexible substrate, a driving component mounted on the first flexible substrate and configured to process and supply a signal from the signal-transmission substrate to the display panel to drive the display panel and display an image, and a second flexible substrate having one end part that is connected to the functional unit and another end part that is connected to a part of the first flexible substrate that is closer to the display panel than a display panel side end edge of the driving component that is mounted on the first flexible substrate.

7 Claims, 10 Drawing Sheets

(51) Int. Cl.
*G02F 1/1335* (2006.01)
*G06F 3/041* (2006.01)
*F21V 8/00* (2006.01)
*G02F 1/13357* (2006.01)

(52) U.S. Cl.
CPC .... *G02F 1/13338* (2013.01); *G02F 1/133305* (2013.01); *G02F 1/133615* (2013.01); *G06F 2203/04102* (2013.01)

(58) Field of Classification Search
CPC ............ G02F 1/1335; G02F 1/133525; G02F 1/133528; G02F 1/133514; G02F 1/1362; G02F 1/1368; G02F 2001/133612; H05K 1/147; H05K 1/189; H05K 1/142; H05K 2201/10136; H05K 2201/056; H05K 2201/01–106; G06F 2203/04102; G06F 2203/04103; G06F 3/041; G02B 6/0083
See application file for complete search history.

DISPLAY DEVICE

TECHNICAL FIELD

A technology disclosed by the present Description relates to a display device.

BACKGROUND ART

In the past, a planate thin visual display device used in products such as an electronic device etc. is configured to include at least a display panel which displays an image, a driving component (integrated circuit driver etc.) for displaying an image, and a signal-transmission substrate which transmits a signal for image display to the driving component. In products which require high-definition especially, a display device of a so-called COG (Chip on Glass) mounting method where the driving component for image display is directly mounted in a peripheral edge part (non-display area) of a transparent substrate (glass substrate) constituting a display panel has been used in many cases. However, in recent years, in a portable telephone terminal etc., for example, making a frame size narrower to reduce the non-display area of a display device is requested and a trial to change arrangement of a driving component is carried out for this reason.

For example, in the following patent document 1, a technology in which a hard circuit board is connected to a liquid crystal display panel via a TCP (Tape Career Package), and a driving component is mounted on this hard circuit board is disclosed. In the liquid crystal display device according to the patent document 1, while achieving reduction of a frame width of the display device by making narrow a width of the hard circuit board arranged in approximately the same plane as the transparent substrate of the display panel, a wiring area has been secured while a wide portion of the hard circuit board is stacked on the lower part of the liquid crystal display panel and the outside of an image display area. However, the driving component is mounted on the hard circuit board arranged on the same plane as the transparent substrate, and there has been a limit in making narrower the frame width of the display device.

RELATED ART DOCUMENT

Patent Document

[Patent Document 1] Japanese Unexamined Patent Application Publication No. H6-59270

Problem to be Solved by the Invention

For achieving further reducing a frame width, adoption of a so-called COF (Chip on Film) mounting method in which a driving component is mounted on a flexible film can be considered. Specifically, the driving component is mounted on the flexible COF film, and with respect to this flexible substrate for image display (FPC: Flexible Printed Circuit) one end part and the other end are connected to a transparent substrate of the display panel and a signal-transmission substrate, respectively. In this case, in order to deal with an increase in the number of terminals in association with high-definition of a display image, driving components are preferred to be arranged in a longitudinal shape prolonged along an image display area of the display panel in the flexible substrate for image display.

In a display panel of a display device, functional units such as a back light and a touch panel, etc. are internally installed or exteriorly installed in many cases. These functional units are ones which collaborate with the display panel, and signals for driving these are also transmitted from the signal-transmission substrate. As the result, also these functional units are needed to be connected with the signal-transmission substrate through a flexible substrate for functional units, etc. However, when the above-mentioned flexible substrate for image display and flexible substrate for functional units are each connected directly to the signal-transmission substrate, external form interference will be caused between driving components arranged longitudinally and the flexible substrate for functional units, which is not desirable. If the flexible substrate for functional units is arranged on the outside of the flexible substrate for image display in order to avoid external form interference, the flexible substrate for functional units is protruded from the display panel, and the outermost form of the display device becomes large, and a merit of reducing a frame width will have been deteriorated.

DISCLOSURE OF THE PRESENT INVENTION

The present technology is completed based on the above situations, and the object is to reduce a frame width of a display device while dealing with high-definition of a display image.

Means for Solving the Problem

A display device includes a display panel configured to display an image, a functional unit internally installed or exteriorly installed in the display panel, a first flexible substrate connected to the display panel in one end part thereof and have flexibility, a signal-transmission substrate connected to another end part opposite to the one end part of the first flexible substrate and configured to transmit a signal for driving the display panel and the functional unit to the first flexible substrate, a driving component mounted on the first flexible substrate and configured to process and supply a signal from the signal-transmission substrate to the display panel to drive the display panel and display an image, and a second flexible substrate having flexibility, the second flexible substrate having one end part that is connected to the functional unit and another end part opposite to the one end part, the other end part of the second flexible substrate being connected to a part of the first flexible substrate, the part being closer to the display panel than a display panel side end edge of the driving component that is mounted on the first flexible substrate.

In the above-mentioned configuration, by the signal transmitted to the first flexible substrate from the signal-transmission substrate, driving of the display panel is controlled and the image is displayed on the display panel via the driving component mounted on this first flexible substrate. Here, since the driving component is mounted on the first flexible substrate, the arrangement flexibility is enhanced. When compared temporarily with a case where the driving component is mounted directly on the display panel, it becomes unnecessary to secure the mounting space of the driving component in the display panel, and it is possible to reduce a frame width. On the other hand, the functional unit is connected with the signal-transmission substrate via the second flexible substrate and the first flexible substrate, and is controlled by the signal transmitted from the signal-transmission substrate. Here, the other end of the second flexible substrate connected not to the signal-transmission substrate, but also to the position closer to the display panel rather than the driving component in the first flexible substrate. In this way, the external form interference between the driving component and the second flexible substrate is avoidable. Incidentally, in the present Description, "unit" means one which provides a specific function, and means the minimum unit that functions as a bundle, which cannot be used while decomposed any more than that, and it Shall not be questioned whether the number of the constituent is a singular number or a plural number.

As embodiments of the display device according to the present technology, the following configurations are preferred.

(1) The display panel may be divided into a display area displaying an image and a non-display area surrounding the display area. The one end part of the first flexible substrate may be connected to the non-display area, and the driving component may be longitudinally arranged along the one end part of the first flexible substrate, and at least a part of the display panel side end edge thereof may be opposed to at least a part of a connection section between the first flexible substrate and the second flexible substrate. With such a configuration, miniaturization of the display device can be achieved by making the first flexible substrate bent. Here, since the other end of the second flexible substrate is connected to the position close to the display panel rather than the driving component of the first flexible substrate, the driving component can be longitudinally arranged along one end part of the first flexible substrate without causing an external form interference with the second flexible substrate. As the result, even when the number of terminals increases in accordance with high-definition of a display image, connection between a terminal and a driving component can be made favorably while driving components are made to extend more longitudinally.

(2) The first flexible substrate may be connected to a display surface side of the display panel, and the first flexible substrate may have a connection surface side connected to the display panel and the driving component may be mounted on and the second flexible substrate may be connected to the connection surface side of the first flexible substrate. In this way, the first flexible substrate can be made into a one side mounting substrate, and is advantageous in a manufacture aspect and cost aspect. In addition, when the first flexible substrate and the second flexible substrate are made to be bent and turned to the side of the back side face of the display panel, the both flexible substrates between connection area and the driving component will be wound around into the inside of the substrate, which is advantageous when suppressing a damage to these and at the same time, achieving miniaturization of the display device.

(3) The first flexible substrate may be curved such that the driving component is arranged so as to be opposed to a plate surface of the display panel opposite to a display surface thereof. In this way, this is useful in particular to reduce a frame width.

(4) The first flexible substrate may be curved such that the driving component is arranged so as to be opposed to an end face of the display panel with respect to a thickness direction thereof. In this way, it is possible to reduce a frame width without making a thickness of the display device increase, and it is possible to make a length of the first flexible substrate shortened comparatively.

(5) The display panel may be a liquid crystal panel including liquid crystals as a display element, and the functional unit may be a back light unit. As the result, in the liquid crystal display device used abundantly in devices in which compatibility of high-definition and miniaturization are requested, the present technology is effectively utilizable.

(6) The functional unit may be a touch panel unit. As for the touch panel unit, signals transmitted to this are large in number, and in accordance with this, wirings become also large in number. Therefore, the width which is orthogonal to the wiring connecting direction of the second flexible substrate becomes large, and it is easy to cause external form interference with the driving component. In such a configuration, the present technology is effectively utilizable in particular.

Advantageous Effect of the Invention

According to the present technology, it is possible to reduce a frame width of the display device.

MODES FOR CARRYING OUT THE
INVENTION

First Embodiment

Figure 2:
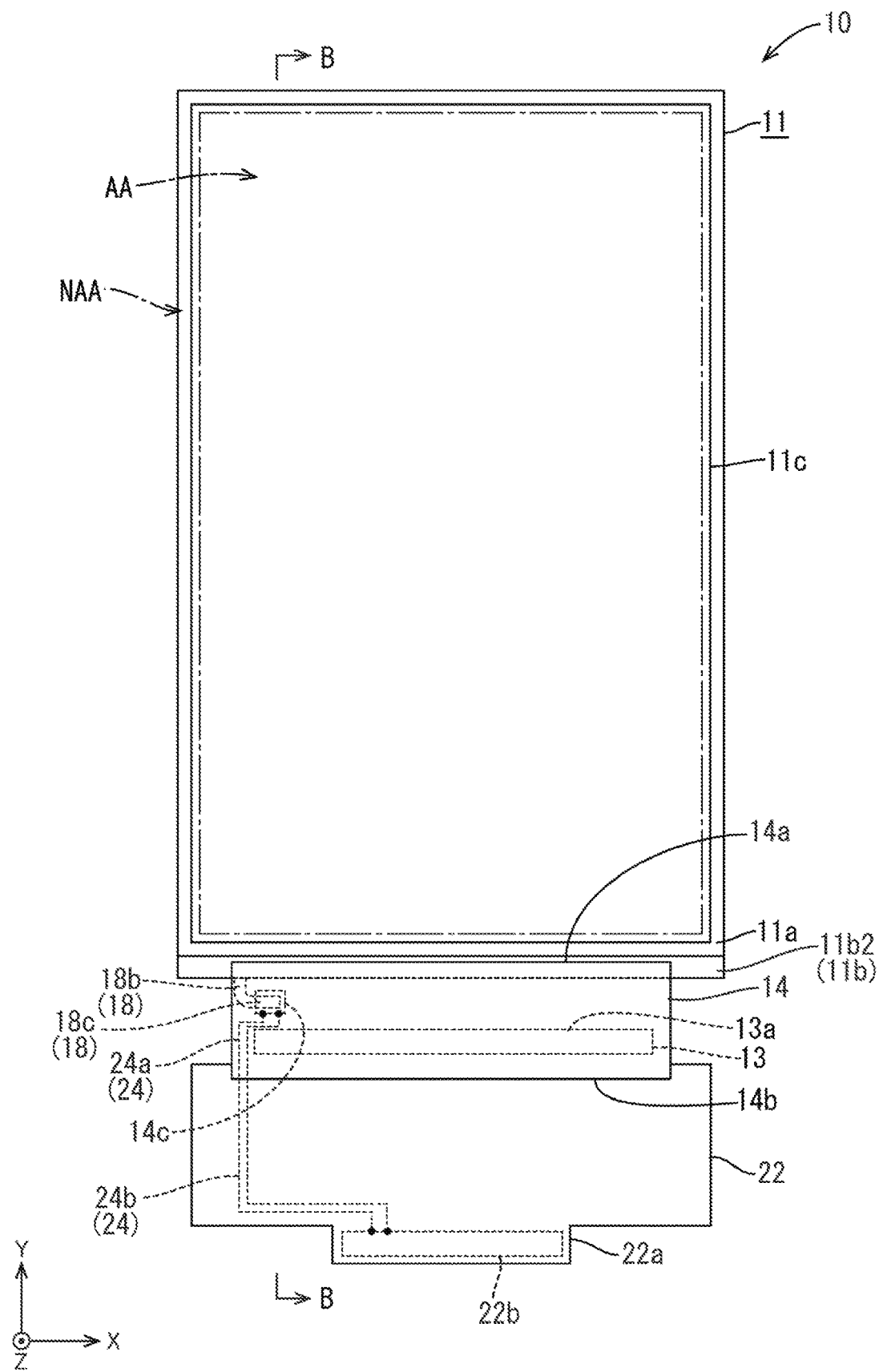
FIG. 2 is an outline plan view Illustrating connecting constitution of a liquid crystal panel, a flexible substrate for a liquid crystal panel and (first flexible substrate), an LED substrate (second flexible substrate), a signal-transmission substrate and a driving component.
Figure 3:
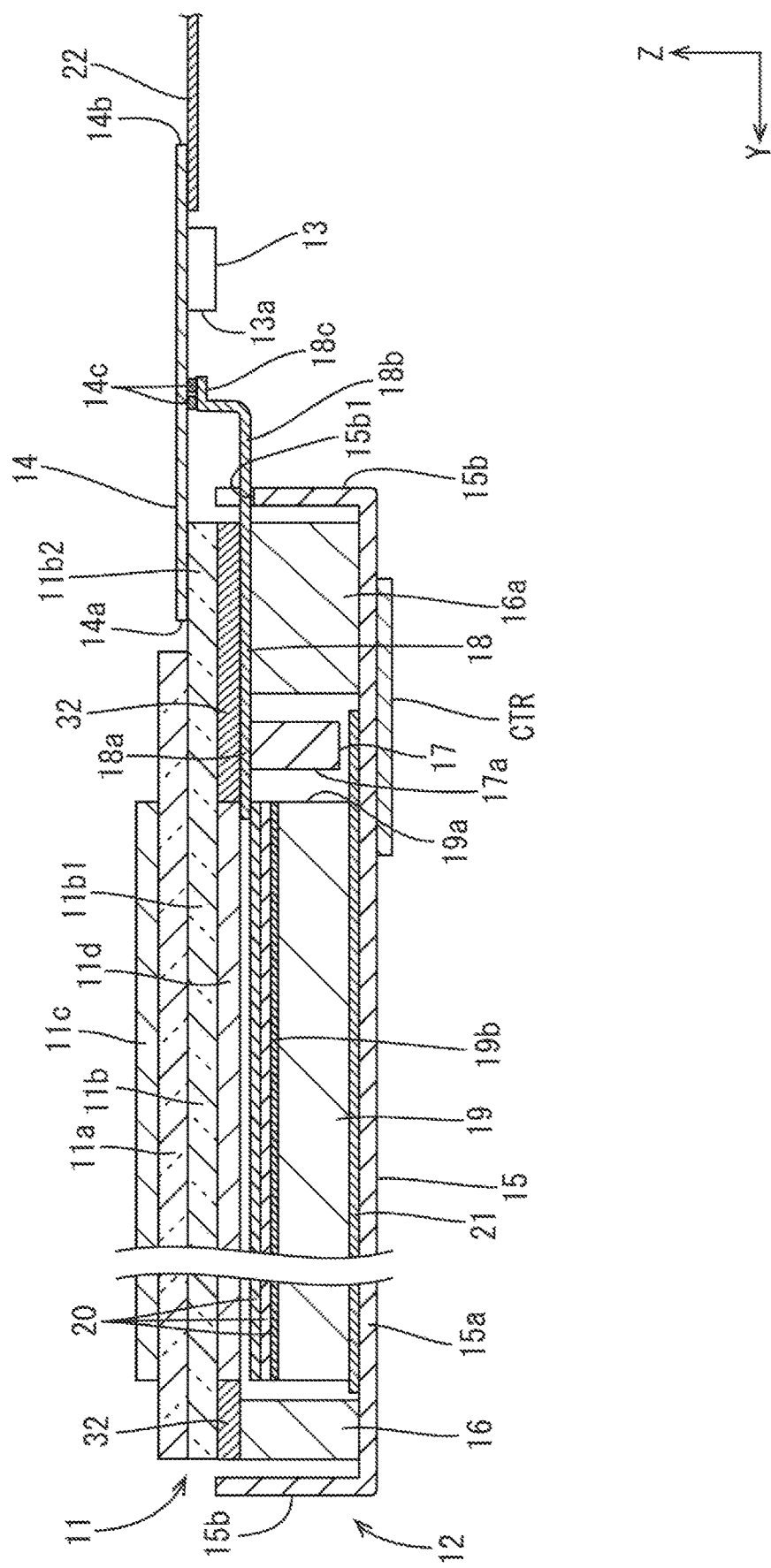
FIG. 3 is a B-B sectional view of FIG. 2.
Figure 4:
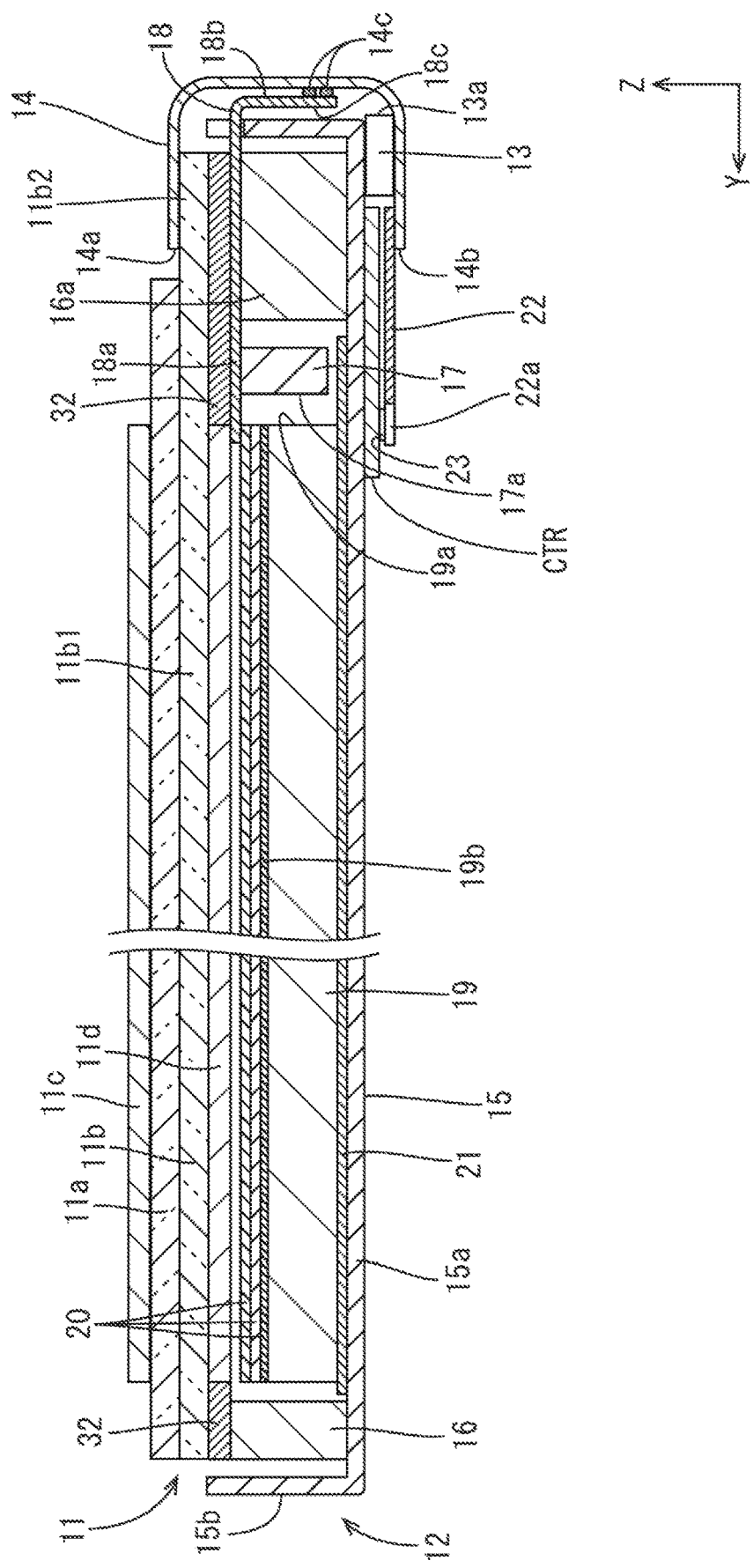
FIG. 4 is a rough sectional view illustrating the connecting constitution of the flexible substrate for the liquid crystal panel and LED substrate in the state of being bent and arranged, with the liquid crystal panel, the signal-transmission substrate and the driving component.

First embodiment will be described with reference to FIG. 1 to FIG. 4. In the present embodiment, a liquid crystal display device (display device) 10 will be illustrated. Incidentally, the X-axis, the Y-axis, and the Z-axis are indicated in a part of each drawing, and each axial direction is drawn so as to be the same direction in each figure. In addition, with respect to a vertical direction. FIG. 3 and FIG. 4 are made to be a reference, and the upper side of the figures is made to be a front side, and the underside of the figures is made to be a back side.

Figure 1:
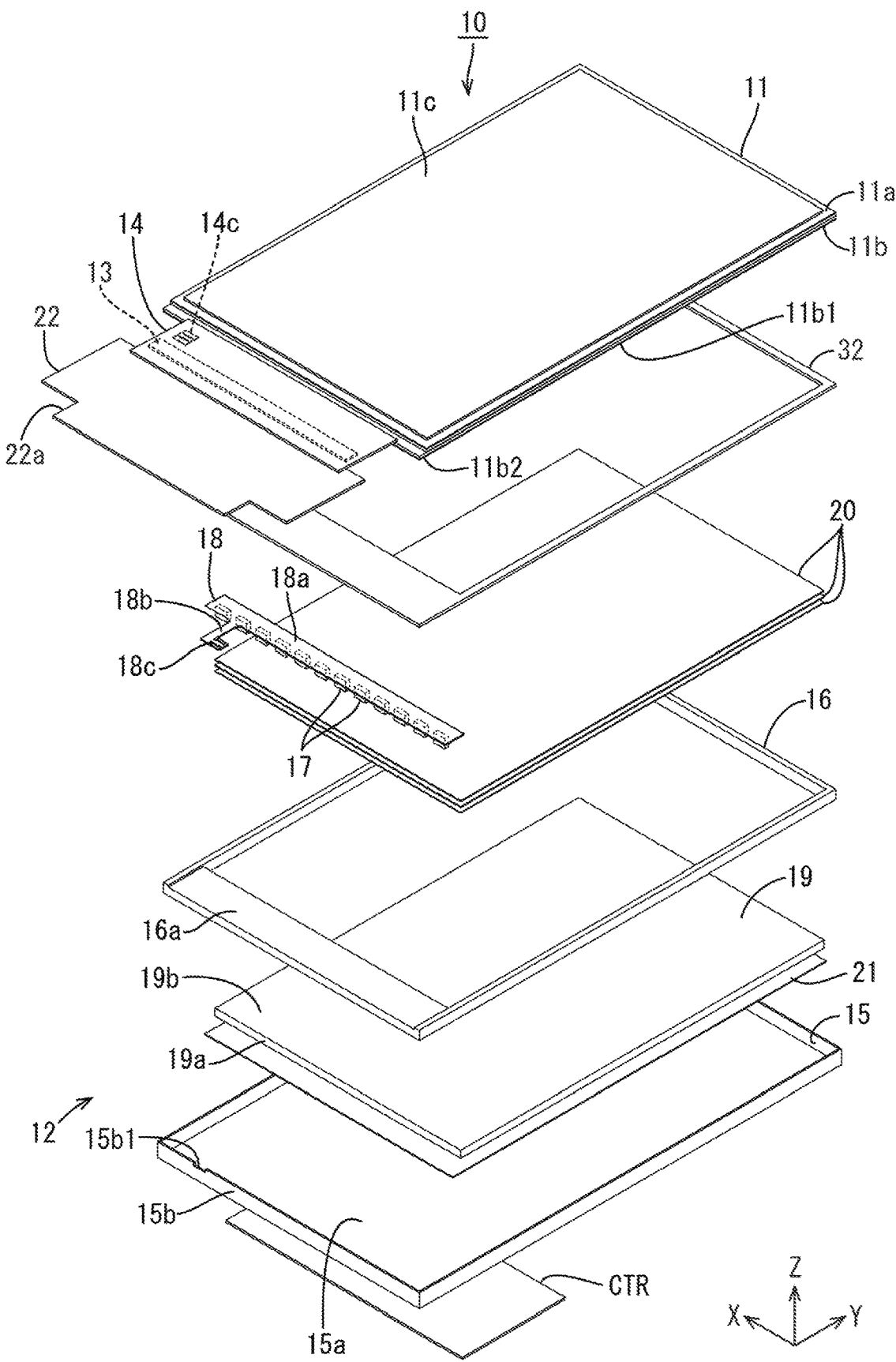
FIG. 1 is exploded perspective view of a liquid crystal display device according to Embodiment 1.

The liquid crystal display device 10 makes a rectangular form as a whole, and is provided with, roughly as illustrated in FIG. 1, a liquid crystal, panel (display panel) 11 for displaying an image, and a back light unit (functional unit) 12 which is an external light source arranged on the back side of the liquid crystal panel and irradiating the liquid crystal panel 11 with a light for displaying. Incidentally, acceptable is a configuration to arrange a frame-shaped member (bezel) which is not illustrated in the front side of the liquid crystal panel 11, for example, and to sandwich/hold the peripheral part (non-display area NAA mentioned below) of the liquid crystal panel 11 between the back light units 12. The liquid crystal display device 10 according to the present embodiment is one which is used in a portable telephone terminal (a smart phone etc. are included), a notebook computer (a tablet type notebook computer etc. are included), a wearable terminal (smart watch etc. are included), a personal digital assistant (an electronic book, PDA, etc. are included), a handheld gaming device, and various electronic devices such as a digital photo frame (not shown). Therefore, a screen size of the liquid crystal panel 11 is assumed as several inches to ten-several inches, and is assumed as the size generally classified into a small type or a middle/small type.

First, the liquid crystal panel 11 will be described. As illustrated in FIG. 2, the liquid crystal panel 11 makes a rectangular form in a plan view as a whole, and is arranged so that the short side direction may be in agreement with an X axial direction, and the long side direction may be in agreement with a Y axial direction, and furthermore, a thickness direction may be in agreement with a Z axial direction. In the liquid crystal panel 11, formed are a display area (active area) AA located in a screen center side in which an image is displayed, and a non-display area (non-active area) NAA located in a screen outer periphery side, in which an image is not displayed and which makes a frame shape (frame shaped or annular) surrounding the display area AA. In FIG. 2, the outline of the display area AA is illustrated with a dashed dotted line. As illustrated in the figure, in the liquid crystal panel 11 according to the present embodiment, the display area AA is formed into a rectangular form by four straight shaped sides.

The liquid crystal panel 11 is provided with a pair of substrates 11a and 11b and a liquid crystal layer (not illustrated) including a liquid crystal molecule which intervenes between both substrates 11a and 11b and is a material in which optical properties thereof changes in accordance with an electric field application, and both substrates 11a and 11b are stuck together by a not illustrated seal adhesive in a state where a cell gap corresponding to a thickness of the liquid crystal layer is maintained. Both substrates 11a and 11b are each provided with a glass substrate excellent in translucency which is made of non-alkali glass or silica glass, etc., and are formed with two or more of films laminated by a known photolithography method etc. on respective glass substrate.

Among substrates 31a and 11b, one that is arranged in an upper side (front side) is assumed to be a CF-substrate (color filter substrate, counter substrate) 11a, and one that is arranged in a lower side (back side) is assumed to be an array substrate (active matrix substrate, element substrate) 11b. Although being almost equivalent in a length dimension of the short side to the array substrate 11b as illustrated in FIG. 1 and FIG. 2, the CF substrate 11a is smaller in a length dimension of the long side than the array substrate 11b, and is stuck together in a state where one (upper part illustrated in FIG. 2) end with regard to the long side direction is made to be aligned with respect to the array substrate 11b. Therefore, in the other (lower part illustrated in FIG. 2) end with regard to the long side direction in the array substrates 11b, a portion where the CF substrate 11a is not overlapped over a prescribed range exists. Hereinafter, a portion overlapped with the CF substrate 11a in a plan view is assumed to be a CF substrate overlapped part 11b1 in the array substrate 11b, and a portion which is not overlapped in a plan view with the CF substrate 11a, but is arranged in the side of the CF substrate overlapped part 11b1 is assumed to be a CF substrate non-overlapping part 11b2. As illustrated in FIG. 2, the above-mentioned display area AA is formed in the overlapping portion of the CF substrate 11a with the array substrate 11b, and the CF substrate non-overlapping part 11b2 of the array substrate 11b is assumed to be the non-display area NAA in the whole area. To this CF substrate non-overlapping part 11b2, a flexible substrate (first flexible substrate) 14 for the liquid crystal panel mentioned below is connected.

In the external surface side of both substrates 11a and 11b, polarizing plates 11c and 11d are attached, respectively (refer to FIG. 3 and FIG. 4). Each polarizing plate 11c and 11d makes a rectangular form in a plan view as with each substrate 11a and 11b, and is assumed to have a dimension a little smaller than the CF substrate 11a, and is arranged almost concentrically with the CF substrate 11a. As the result, while the external surface of the CF substrate 11a is exposed by almost uniform width over the entire circumference, the external surface of the array substrate 11b is exposed, in one short side part, broadly by the width corresponding to the CF substrate non-overlapping part 11b2 compared with other side part. Note that in the inner-surface side of both substrates 11a and 11b, an orienting film for carrying out orientation of the liquid crystal molecule included in the liquid crystal layer is formed, respectively.

Hereinafter, a configuration which exists in the display area AA in the array substrate 11b and the CF substrate 11a will be described briefly. Incidentally, with respect to each following configuration, illustration is omitted. In the inner-surface side (liquid crystal layer side, opposed face side with the CF substrate 11a) of the array substrate 11b, a TFT (Thin Film Transistor: display element) which is a switching element, and the pixel electrode made of a clear electrode are provided in a matrix state side by side by many pieces, and a gate line and source line which make lattice shape are arranged so as to surround these. In other words, the TFT and the pixel electrode are arranged in parallel in a matrix form at the intersection of the gate line (scanning line) and the source line (data line, signal line) which make lattice shape. The gate line and the source line are connected to a gate electrode and source electrode of the TFT, respectively, and the pixel electrode is connected to a drain electrode of the TFT. Then, when the TFT is driven based on various signals supplied to the base line and the source line, supply of an electric potential to the pixel electrode is controlled in accordance with the driving. In addition, in this display area AA, a common electrode made of a transparent electrode film like the pixel electrode is laminated via an insulator layer on the upper layer side between the pixel electrodes.

On the other hand, on the CF substrate 11a, provided is a color filter in which each coloring section such as R (red), G (green), and B (blue) is arranged in a large number in parallel in the matrix state so as to be overlapped with each pixel electrode in the array substrate 11b side in a plan view. Between each of coloring sections constituting the color filter, a light shielding layer (black matrix) of the approximately lattice shape for preventing color mixture is formed. The light shielding layer is assumed to be arranged to be overlapped with the above-mentioned gate line and source line in a plan view. On the surface of the color filter and the light shielding layer, the solid counter electrode (not-illustrated) which is opposed to the pixel electrode in the array substrate 11b side is provided. Incidentally, in this liquid crystal panel 11, one display pixel which is a display unit is constituted by the coloring section of 3 colors: R (red), G (green) and B (blue), and three pixel electrodes which are opposed to them, respectively. The red pixel which has the coloring section of R, the green pixel which has the coloring section of G and the blue pixel which has the coloring section of B forms a pixel group by being arranged side by side repeatedly along a row direction (X axial direction) on the plate surface of the liquid crystal panel 11, and these pixel groups are arranged in large numbers side by side along a column direction (Y axial direction).

Next, the back light unit (functional unit) 12 will be described. The back light unit 12 according to the present embodiment is provided with a chassis (casing, cabinet) 15 which makes approximately box-like opened toward the liquid crystal panel 11 side (front side) as illustrated in FIG. 1. In the inside of the chassis 15, stored are: a frame 16, and an LED (Light Emitting Diode) 17 which is the light source mounted on an LSD substrate (feeding member for lighting devices, light source substrate, second flexible substrate) 18 mentioned below. In addition, so as to cover the opening section of the chassis 15, arranged are: a light guide plate 19 which light-guides a light from the LED 17; an optical sheet (optical member) 20 which is arranged by being laminated on the front side of the light guide plate 19; and reflective sheet (reflecting member) 21 which is arranged by being laminated on the back side of the light guide plate 19. While the LED 17 is arranged in a form of being unevenly distributed close to one short side part in the liquid crystal panel 11, specifically the short side part in the side corresponding to the CF substrate non-over lapping part 11b2, this back light unit 12 is assumed to be an edge light type that is a one side incident type (sidelight type) where a light is entered only from one side with respect to the light guide plate 19.

Hereinafter, component parts of the back light unit 12 will be described one by one. The chassis 15 is made from a metal plate such as an aluminum plate and an electro galvanizing steel sheet (SECC), for example, and is formed so as to make external form like a shallow plate which is made from a bottom plate part 15a of a rectangular form in a plan view, and a side plate part 15b which rises from the outer edge of the bottom plate part each toward the upper side (front side). The chassis 15 is arranged so that a long side direction of a bottom plate part 15a may be in agreement with the Y axial direction, a short side direction may be in agreement with the X axial direction, and the plate surface may be parallel with each plate surface of the liquid crystal panel 11, the light guide plate 19 and the optical sheet 20, On the back side face (undersurface) of the bottom plate part 15a, substrates such as a control circuit board (control substrate) CTR are attached as illustrated in FIG. 3 and FIG. 4. Among four sides of the side plate parts 15b, in a side plate part 15b (side plate part 15b of the front left-hand side illustrated in FIG. 1) located in one short side part where the LED 17 is arranged, a drawer notch 15b1 for pulling out outside the LED substrate 18 mentioned below is formed.

The frame 16 is made from a synthetic resin, and makes a rectangle frame shape in a plan view as a whole (viewed from the normal line direction of the plate surface of the light guide plate 19), and is formed so as to have an external form which is somewhat smaller than the chassis 15 and Is somewhat larger than the light guide plate 19. The frame 16 is stored in the chassis 15 in a state of surrounding the light guide plate 19 from the outer periphery side, and in a state where the circumference thereof is surrounded by the four sides of the side plate part 15b. In one short side part among a pair of the short side parts making the frame 16, an LED substrate supporter 16a (light source substrate supporter) which is overlapped with an LED mounted part 18a of the LED substrate 18 mentioned below in a plan view, and supports the LED mounted part 18a from a lower side (back side) is formed (refer to FIG. 3 and FIG. 4). The LED substrate supporter 16a, as illustrated in FIG. 3 and FIG. 4, has sandwiched the LED 17 between an LED opposite end face 19a of the light guide plate 19 mentioned below with respect to the Y axial direction, and is made to be relatively large in a width dimension, and relatively small in a thickness dimension (height dimension, dimension with respect to the Z axial direction) compared to other three side parts which make the frame 16 (a pair of the long side part, and the short side part of the opposite side to the LED substrate supporter 16a).

The LED 17 is assumed to have a configuration where an LED chip (LED device) which is a semiconductor light emitting element is sealed with a resin material on the substrate part fixed to the plate surface of the LED substrate 18. As for the LED chip mounted on the substrate part, a main-light-emission wavelength is assumed to be one type, and specifically, one which emits monochromatic light of blue color has been used. On the other hand, in the resin material to seal the LED chip, a fluorescent material which emits light of a prescribed color while excited by the blue light emitted from the LED chip is dispersed and compounded, and a white light almost as a whole is assumed to be emitted. This LED 17 is one which is so-called a side-emitting type, and a side surface adjoining a mounting surface with respect to the LED substrate 18 is assumed to be the light emitting surface 17a. The LED 17, as illustrated in FIG. 1, is mounted in a form where two or more pieces (12 pieces in FIG. 1) are intermittently arranged in a line along a length direction (X axial direction) of the LED mounted part 18a of the LED substrate 18 mentioned below, and adjacent LED 17 are connected mutually serially by a wiring pattern. An array pitch between adjacent LED 17 is approximately constant, and it can be said that each LED 17 is arranged mostly at an equal interval with respect to the X axial direction.

The light guide plate 19, as illustrated in FIG. 1 etc., makes a rectangular plate-shape somewhat smaller than the inside dimension of the frame 16 in a plan view, and as illustrated in FIG. 3 and FIG. 4, is stored in the chassis 15 in a state of being surrounded by the frame 16, and is arranged at a position just under the liquid crystal panel 11 and the optical sheet 20. As for the light guide plate 19, an end face of the side of the short side of the right-hand side illustrated in FIG. 3 and FIG. 4 among the peripheral end faces makes an opposing state to the LED 17, and is assumed to be an LED opposite end face (light source opposite end face) 19*a* to which the light from the LED 17 is incident, and functions as a "light incidence face." Each end face of the other three sides (end face of the side of the short side of the left-hand side, and the end face of the side of a pair of the long side, illustrated in FIG. 3 and FIG. 4) is assumed to be an LED non-opposite end face (light source non-opposite end face) which is not opposed to the LED 17 and to which a light from the LED 17 is not directly incident. In addition, the plate surface facing the front side (liquid crystal panel 11 side) among the plate surfaces of the back-and-front pair in the light guide plate 19 is assumed to be the light emitting surface 19*b* which makes a light emitted to the liquid crystal panel 11. According to such a configuration, the arrangement direction of the LSD 17 and the light guide plate 19 is in agreement with the Y axial direction, and the arrangement direction of the optical sheet 20 (liquid crystal panel 11) and the light guide plate 19 is in agreement with the Z axial direction, and both arrangement directions are assumed to be mutually orthogonal. Then, the light guide plate 19 has a function to introduce a light emitted from the LED 17 along the Y axial direction from the LED opposite end face 19*a*, and rise the light toward the optical sheet 20 side (side of front side, optical emission side) while making the light propagate inside, and make the light emitted from light emitting surface 19*b* which is a plate surface on the front side.

The optical sheet 20, as illustrated in FIG. 1, makes a rectangular form in a plan view like the light guide plate 19, and is placed on the front side of the light emitting surface 19*b* of the light guide plate 19, and is arranged while intervening between the liquid crystal panel 11 and the light guide plate 19, and thereby, makes the light emitted toward the liquid crystal panel 11 while having the emitted light from light guide plate 19 penetrated and giving a prescribed optical action to the transmitted light. The optical sheet 20 has two or more sheets (three sheets in the present embodiment) laminated to each other. Incidentally, as the specific type of the optical sheet 20, there are a diffuser sheet, a lens sheet, a reflection type polarizing sheet, etc., for example, and these can be used while being selected suitably.

The reflective sheet 21, as illustrated in FIG. 1 and FIG. 3, etc., is arranged in a form of covering the back side of the light guide plate 19, i.e., the plate surface of the opposite side to the light emitting surface 19*b*. This reflective sheet 21, since having the surface made of a sheet material made from a synthetic resin which is assumed to be silver or white excellent in light reflection characteristics, can rise efficiently a light which propagates the inside of the light guide plate 19 toward the front side (light emitting surface 19*b*). The reflective sheet 21 makes a rectangular form which has somewhat a larger external form than the light guide plate 19, and as illustrated in FIG. 3 and FIG. 4, the center side portion thereof is sandwiched between the light guide plate 19 and the bottom plate part 15*a* of the chassis 15, and the peripheral end is arranged in a form of being protruded outside the peripheral end face of the light guide plate 19.

In the present embodiment according to the liquid crystal panel 11, as illustrated in FIG. 1 and FIG. 3, etc., a fixing member 32 which makes a rectangular frame shape (frame shaped, annular) in a plan view, following the non-display area NAA and the frame 16 of the liquid crystal panel 11 is fixed and sandwiched between the plate surface of the back side of the liquid crystal panel 11 and the LED substrate 18 constituting the back light unit 12 and the face on the front side in the frame 16, and fixation of the liquid crystal panel 11 with the back light unit 12 is achieved.

Next, members connected to the liquid crystal panel 11 will be described. To the array substrate 11*b* of the liquid crystal panel 11, as illustrated in FIG. 1 to FIG. 4, the flexible substrate 14 for the liquid crystal panel is connected. The flexible substrate 14 for the liquid crystal panel, as illustrated in FIG. 1 and FIG. 2, is provided with a base material where a synthetic resin material which is made from an Insulating material and has flexibility is formed in the film shape (sheet shaped) which makes rectangular in a plan view, and on the base material, many circuit patterns (not shown) are wired and formed. Therefore, the flexible substrate 14 for the liquid crystal panel is high in bending flexibility (flexibility, deformation simplicity) compared with a glass substrate GS etc., and it is possible to bend easily or to fold up. As the synthetic resin material which constitutes the base material of the flexible substrate 14 for the liquid crystal panel, polyimide or PET, etc. can be used, for example.

The flexible substrate 14 for the liquid crystal panel, as illustrated in FIG. 1 and FIG. 2, is arranged so that the long side direction of the plate surface of the rectangular may be in agreement with the X axial direction, and the side edge part of the side of one long side is connected to the liquid crystal panel 11 and the side edge part of the side of the other long side is each connected to a signal transmission substrate 22 mentioned below. As illustrated in the figure, a length dimension of the long side of the flexible substrate 14 for the liquid crystal panel can be configured to be small a little rather than the length dimension of the short side of the liquid crystal panel 11. In this way, as described later with reference to FIG. 4, when the flexible substrate 14 for the liquid crystal panel is bent and arranged so as to be along one side plate part 15*b* of the chassis 15, this flexible substrate 14 for the liquid crystal panel does not protrude from the back side face of the liquid crystal panel 11, and it is preferred for the liquid crystal display device 10 to be made small. In addition, a length dimension of the short side of the flexible substrate 14 for the liquid crystal panel is configured to reach the back side face of the bottom plate part 15*a* of the chassis 15 over one end face of the array substrate life and one plate surface of the side plate part 15*b* of the chassis 15 from one end part of the surface of the array substrate 11*b* of the liquid crystal panel 11 when this flexible substrate 14 for the liquid crystal panel is bent and arranged as mentioned above. Hereinafter, in the flexible substrate 14 for the liquid crystal panel, the side edge connected to the liquid crystal panel 11 is assumed to be a first side edge 14*a*, and the side edge connected to the signal-transmission substrate 22 is assumed to be a second side edge 14*b*. The first side edge 14*a* is connected to the CF substrate non-overlapping part 11*b*2 of the array substrate 11*b* which is the non-display area NAA. In addition, in the position close to the second side edge 14*b* in the flexible substrate 14 for the liquid crystal panel, a driver 13 (components for drive) formed in a long prismatic shape which extends along the first side edge 14*a* (i.e., in the X axial direction) is mounted.

The driver 13 will be described. The driver 13 according to the present embodiment is made of an LSI chip which has a drive circuit inside, and processes a input signal supplied via the signal-transmission substrate 22 from a control circuit board CTR which is a signal supply source to generate an output signal, and outputs the output signal to the display area AA of the liquid crystal panel 11. This driver 13 makes in a plan view an oblong rectangular shape, and is mounted in the back side face of the flexible substrate 14 for the liquid crystal panel so that the longitudinal direction may be in agreement with the X axial direction and the transverse direction may be in agreement with the V axial direction. Hereinafter, among end edges of the driver 13, the end edge which is arranged in the first side edge 14a side of the flexible substrate 14 for the liquid crystal panel is assumed to be the first end edge 13a. The driver 13 according to the present embodiment, as illustrated in FIG. 2, is arranged so as to extend in a long length as much as possible after securing a wiring area of an LED wiring 24 mentioned below in the long side direction (X axial direction) of the flexible substrate 14 for the liquid crystal panel. As the result, even when connection structures such as a wiring become increased or minute in accordance with an image displayed on the liquid crystal panel 11 being made highly minute, each connection structure can be favorably connected to the driver 13.

The signal-transmission substrate 22 will be described. The signal-transmission substrate 22 is a substrate which transmits various input signals for controlling drive of the liquid crystal panel 11 and the back light unit 12. The signal-transmission substrate 22 in the present embodiment is assumed as a flexible substrate which is provided with a base material where a synthetic resin material which is made from an insulating material and has flexibility is formed in a film shape (sheet shaped), and is formed by wiring and forming not shown circuit patterns on this base material. The signal-transmission substrate 22, as illustrated in FIG. 1 and FIG. 2, is formed so as to make an approximately T-shaped form with a projection part 22a projected in a rectangular form from the central part of one long side of a rectangle in a plan view, and is arranged so that the plate surface thereof may be parallel, with each plate surface of the liquid crystal panel 11 and the light guide plate 19, etc., and the long side direction may be in agreement with the X axial direction, and the short side direction and the projection direction of the projection part 22a may be in agreement with the Y axial direction. Then, the end of the side of the long side in which the projection part 22a is not formed is connected to the flexible substrate 14 for the liquid crystal panel, and the projection part 22a is connected to the control circuit board CTR which supplies various input signals.

The control circuit board CTR, as illustrated in FIG. 1 and FIG. 3, etc., is attached with not-illustrated screws etc. on the back side face (external surface of the opposite side to the liquid crystal panel 11 side) of the chassis 15 in the back light unit 12. The control circuit board CTR is assumed as one where the electronic parts for supplying various input signals to the driver 13 etc. mentioned below are mounted on a substrate made of paper phenol or glass epoxy resin and at the same time, wirings (conductive path) of the not-illustrated prescribed pattern are wired and formed. In the wirings, included are at least a liquid crystal panel driving circuit, part which supplies various signals to the driver 13; a LSD driving circuit part which supplies an electric power for driving the LED 17 of the back light unit 12; and a grand circuit part for supplying ground potential, to the liquid crystal panel 11.

Next, a connection structure of the flexible substrate 14 for the liquid crystal panel with the array substrate 11b, the driver 13 and the signal-transmission substrate 22 will be described in the following. The back side face of the flexible substrate 14 for the liquid crystal panel is provided with a connection circuit part. The connection circuit part is provided with, as a terminal group, a terminal area for the array substrate connected to the end of the array substrate 11b; a terminal area for the signal-transmission substrate connected to the signal-transmission substrate 22; and a terminal area for driver inputting and a terminal area for driver outputting connected to the driver 13. In addition, the connection circuit part is provided with, as a wiring group, an input-side wiring part which relay-connects the terminal area for the signal-transmission substrate to the terminal area for driver inputting; and an output-side wiring part which relay-connects the terminal area for the array substrate to the terminal area for driver outputting. Although illustration is omitted with a few exceptions with respect to these connection circuit parts, the terminal group and wiring group which constitute the connection circuit part are in all cases assumed to be made from a metallic material (tin, copper, etc.) which is excellent in conductivity. Each terminal area, the mounting area of each connection object, that is, the terminal area for the array substrate and the terminal area for the signal-transmission substrate, and a driver side input terminal area and a driver side output terminal area, are formed by circuit patterns being exposed to the exterior of a back side face side, in the both ends of the side of the long side in the flexible substrate 14 for the liquid crystal panel and in the mounting area of the driver 13, respectively.

Among each terminal area provided in the flexible substrate 14 for the liquid crystal panel, the terminal area for the array substrate and the terminal area for the signal-transmission substrate, via the CF substrate non-overlapping part 11b2 of the array substrate 11b or the signal-transmission substrate 22, which is the connection object of each, and a not-illustrated anisotropic conductive material (ACF: Anisotropic Conductive Film), are connected electrically and mechanically. The anisotropic conductive material mentioned here is made from a binder where many conductive particles are dispersed and compounded, and has become so that the electrical connection and mechanical connection between each terminal may be achieved via conductive particles by an insulating film covering a conductive particles being destroyed or conductive particles being press-fitted mutually with heat or pressure, for example. On the other hand, as for the terminal area for driver inputting and the terminal area for driver outputting, an eutectic connection is made with the flexible substrate 14 for the liquid crystal panel.

The driver side input terminal area and the driver side output terminal area are each connected to a processing circuit included in the driver 13, and the input signal inputted from the driver side input terminal area, after being processed in the processing circuit, can be outputted to the driver side output terminal area. As the result, it is assumed as possible to transmit the signal supplied from the signal-transmission substrate 22 to the driver 13, and transmit the signal processed and outputted in the driver 13 to the array substrate 11b of the liquid crystal panel 11.

On the other hand, in the projection part 22a of the signal-transmission substrate 22, a terminal area for the control circuit board 22b is formed, and the signal-transmission substrate 22 and the control circuit board CTR are connected by fittingly connecting a connector 23 (refer to FIG. 4) connected to the control circuit board CTR to the terminal area for the control circuit board 22b.

To the above-mentioned flexible substrate 14 for the liquid crystal panel, the LED substrate 18 is connected furthermore. The LED substrate 18 will be described. The LED substrate 18, as illustrated in FIG. 1 etc., is provided with a base material where a synthetic resin material which is made from an insulating material and has flexibility is formed in a film shape (sheet shaped), and is arranged so that the plate surface thereof may be parallel with each plate surface of the liquid crystal panel 11 and the light guide plate 19, etc. of the back light unit 12. In addition, with respect to the 2 axial direction, the LED substrate 18 is arranged in the front side (upper side) of the frame 16 and the light guide plate 19 and in the back side (lower side) of the liquid crystal panel 11. As for the LED substrate 18, the plate surface of the back side is assumed to be the LED mounting surface (light source mounting surface) where the above-mentioned LSD 17 is mounted, and the plate surface of the front side is assumed to be an LED non-mounting surface (light source non-mounting surface) where the LED 17 is not mounted. In the LED mounting surface, not-illustrated circuit patterns for supplying an electric power to the LSD 17 are wired and formed.

The LED substrate 18 is provided at least with the LED mounted part 18a which extends along the short side direction (X axial direction) of the back light unit 12, and in which the LED 17 is mounted; a drawing wiring part 18b which extends outward (the opposite side to the light guide plate 19 side) along the Y axial direction from one end in the LED mounted part 18a; and a connection end 18c which is formed in an extension end of the drawing wiring part 18b and is connected to the flexible substrate 14 for the liquid crystal panel. Among these, two or more of the LED 17 are mounted in the back side face of the LED mounted part 18a side by side as mentioned above.

Next, a connection structure of the flexible substrate 14 for the liquid crystal panel with the LED substrate 18 will be described in the following. In the present embodiment, as illustrated in FIG. 2, in the back side face of the flexible substrate 14 for the liquid crystal panel, namely, in a connection surface of the flexible substrate 14 for the liquid crystal panel with the liquid crystal panel 11 and the signal-transmission substrate 22 and the mounting surface of the driver 13, a soldering pad 14c for the LED substrate is formed. This soldering pad 14c for the LED substrate is formed at a position close to the first side edge 14a rather than the first end edge 13a of the driver 13 mounted in the same surface of the flexible substrate 14 for the liquid crystal panel. In addition, as illustrated in FIG. 2, in the flexible substrate 14 for the liquid crystal panel, a wring 24a prolonged to the second side edge 14b side from the soldering pads 14c for the LED substrate is provided, and in the signal-transmission substrate 22, a wiring 24b prolonged toward the second side edge 14b from the terminal area for the control circuit board 22b is provided. Then, as mentioned above, in accordance with the flexible substrate 14 for the liquid crystal panel being connected with signal-transmission substrate 22 by the anisotropic conductive material, both wiring 24a and 24b are connected, and the LED wiring 24 is formed. As the result, a signal transmitted to the signal-transmission substrate 22 from the control circuit board CTR has become to be transmitted to the LED substrate 18 via the flexible substrate 14 for the liquid crystal panel. Note that in the present embodiment, as mentioned above, since the driver 13 is mounted so as to extend as longitudinally as possible in the flexible substrate 14 for the liquid crystal panel, the soldering pad 14c for the LED substrate is arranged at a position opposed to the first end edge 13a of the driver 13 in the Y axial direction. As the result, the wiring 24a, as illustrated in FIG. 2, extends to the signal-transmission substrate 22 side from the first end edge 13a side so as to turn around the one end side of the driver 13, and is connected with the wiring 24b.

In the liquid crystal display device 10, each above-mentioned member is stored in a net-illustrated exterior member. In a state of being stored in the exterior member, as for the flexible substrate 14 for the liquid crystal panel, as illustrated in FIG. 4, a surface cut by a surface which makes the X-axis as a normal vector is bent and arranged so as to make a approximate U shape which is opened to the back light unit 12 etc. side, and the signal-transmission substrate 22 connected to the second side edge 14b is connected via the connector 23 with the control circuit board CTR attached to the back side face of the bottom plate part 15a of the chassis 15. In the present embodiment, a plate surface of a mounting part of the driver 13 within the flexible substrate 14 for the liquid crystal panel is arranged so as to be in parallel with the plate surface of the bottom plate part 15a of the chassis 15 and the control circuit board CTR attached to this, and the driver 13 is stored in a state where the surface of the opposite side of the mounting surface thereof is made opposed to the back side face of the bottom plate part 15a. In addition, in this storing state, not only the flexible substrate 14 for the liquid crystal panel but also the drawing wiring part 18b of the LSD substrate 18 are bent and arranged so as to make an approximate L shape while turned back toward the lower side in the outside of the chassis 15 in the inside of the opening section of the flexible substrate 14 for the liquid crystal panel. In the present embodiment, the connection end 18c of the LED substrate 18 and the soldering pad 14c for the LED substrates of the flexible substrate 14 for the liquid crystal panel are stored in a state of being arranged in the side of the side plate part 15b of the chassis 15.

The liquid crystal display device 10 according to the present embodiment has such structures as mentioned above, and then, an operation will be described. When an electric power source of the liquid crystal display device 10 having configurations mentioned above is turned on, various signals related to an image is transmitted to the flexible substrate 14 for the liquid crystal panel via the signal-transmission substrate 22 from the control circuit board CTR which is a signal supply source, and are supplied to the liquid crystal panel 11 after being processed in the driver 13. The signal supplied to the liquid crystal panel 11 is inputted into the source line from a sauce side terminal area or is inputted into the gate line etc, via a gate side terminal area from a sauce side terminal area depending on the types, and driving of the liquid crystal panel 11 is controlled. On the other hand, the signal related to the drive of the LED 17, which is supplied from the control circuit board CTR, is transmitted to the LED substrate 18 via the flexible substrate 14 for the liquid crystal panel through the LED wiring 24 from the terminal area for the control circuit board 22b of the signal-transmission substrate 22, and driving of each LED 17 mounted in the LED substrate 18 is controlled. The light from each LED 17 is light-guided by the light guide plate 19, and the liquid crystal panel 11 is irradiated via the optical sheet 20, and thereby, a prescribed image is displayed on the liquid crystal panel 11.

As mentioned above, the liquid crystal display device 10 according to the present embodiment is provided with: the liquid crystal panel 11 which displays an image; the back light unit 12 exteriorly installed on the liquid crystal panel 11; the flexible substrate 14 for the liquid crystal panel of which the one end part in alignment with the first side edge 14a is connected to the liquid crystal panel 11, and which has flexibility; the signal-transmission substrate 22 which is connected to the other end along the second side edge 14*b* in the opposite side to the first side edge 14*a* in the flexible substrate 14 for the liquid crystal panel, and transmits the signal for driving the liquid crystal panel 11 and the back light unit 12 to the flexible substrate 14 for the liquid crystal panel; the driver 13 which drives the liquid crystal panel 11 and makes an image displayed by being mounted in the flexible substrate 14 for the liquid crystal panel and processing the signal from the signal-transmission substrate 22 to supply it to the liquid crystal panel 11; and the LED substrate 18 in which the LED 17 of the back light unit 12 is mounted in the LED mounted part 18*a* formed in one end part, and the connection end 18*c* in the opposite side to the LED mounted part 18*a*, in the flexible substrate 14 for the liquid crystal panel, is connected to a position close to the liquid crystal panel 11 rather than the end edge of the liquid crystal panel 11 side of the driver 13 mounted in this flexible substrate 14 for the liquid crystal panel, and which has flexibility.

According to the present embodiment having such configurations as mentioned above, since the driver 13 is mounted on the flexible substrate 14 for the liquid crystal panel, arrangement flexibility of the driver 13 has been enhanced. As compared with a case where the driver 13 is directly mounted on the liquid crystal panel 11 temporarily, it becomes unnecessary to secure a mounting space of the driver 13 in the liquid crystal panel 11, and it has become possible to achieve reduction of a frame width. On the other hand, as for the LED substrate 18 with the LED 17 of the back light unit 12 mounted, the connection end 18*c* thereof is connected to the position close to the first side edge 14*a* rather than the driver 13 in the flexible substrate 14 for the liquid crystal panel. As the result, an external form interference of the driver 13 with the LED substrate 18 has become to be avoided.

In the liquid crystal panel 11 according to the present embodiment, the first side edge 14*a* of the flexible substrate 14 for the liquid crystal panel is connected to the non-display area NAA of the array substrate 11*b*. As the result, by making the flexible substrate 14 for the liquid crystal panel bent along the side edge of the non-overlapping part side of the array substrate 11*b*, it is possible to achieve miniaturization of the liquid crystal display device 10. In addition, the driver 13 is arranged longitudinally along the first side edge 14*a* in the flexible substrate 14 for the liquid crystal panel, and a part of the first end edge 13*a* is opposed to at least a part of the soldering pad 14*c* for the LED substrate to which the connection end 18*c* of the LED substrate 18 is connected. Here, the connection end 18*c* of the LED substrate 18 is connected to the soldering pad 14*c* for the LED substrate formed at the position close to the first side edge 14*a* rather than the driver 13 in the flexible substrate 14 for the liquid crystal panel. As the result, while avoiding the external form interference of the driver 13 with the LED substrate 18, it is possible to arrange the driver 13 longitudinally so as to extend in the long side direction of the flexible substrate 14 for the liquid crystal panel. As the result, even when the number of terminals increases in accordance with making a display image highly minute, it is assumed that it is possible to make connection between each terminal and the driver 13 favorably by the driver 13 being made to extend more longitudinally.

The flexible substrate 14 for the liquid crystal panel is connected to the display surface (front surface) side of the liquid crystal panel 11, and the driver 13 is mounted in, and at the same time the LED substrate 18 is connected to, the back side face side of the flexible substrate 14 for the liquid crystal panel, that, is, the connection surface side with the liquid crystal panel 11. In this way, the flexible substrate 14 for the liquid crystal panel can be made to be a one side mounting substrate, and a manufacture aspect and cost aspect are advantageous, in addition, in the case where the flexible substrate 14 for the liquid crystal panel and the LED substrate 18 are bent and arranged, the connection area of both substrates 14 and 18 and the driver 13 will be wound around into the inside of the flexible substrate 14 for the liquid crystal panel, and it is advantageous also when achieving miniaturization of the liquid crystal display device 10, while these damages etc. are suppressed.

In the liquid crystal display device 10 according to the present embodiment, by the flexible substrate 14 for the liquid crystal panel being bent in the state where the liquid crystal panel 11 and the back light unit 12 are stored in the not-illustrated exterior member inside, the driver 13 is arranged so as to be opposed to the plate surface of the opposite side (back side) to the display surface of the liquid crystal panel 11, Therefore, the configuration has been made advantageous in particular in reducing a frame width of the liquid crystal display device 10.

The present embodiment is in accordance with the liquid crystal display device 10, and includes: the liquid crystal panel 11 which uses a liquid crystal as a display element; and the back light unit 12 exteriorly installed thereto. The liquid crystal display device 10 is used abundantly in devices which are required to be made to be highly-minute and miniaturized, and this technology is effectively utilizable.

Modification Example 1 of First Embodiment

Figure 5:
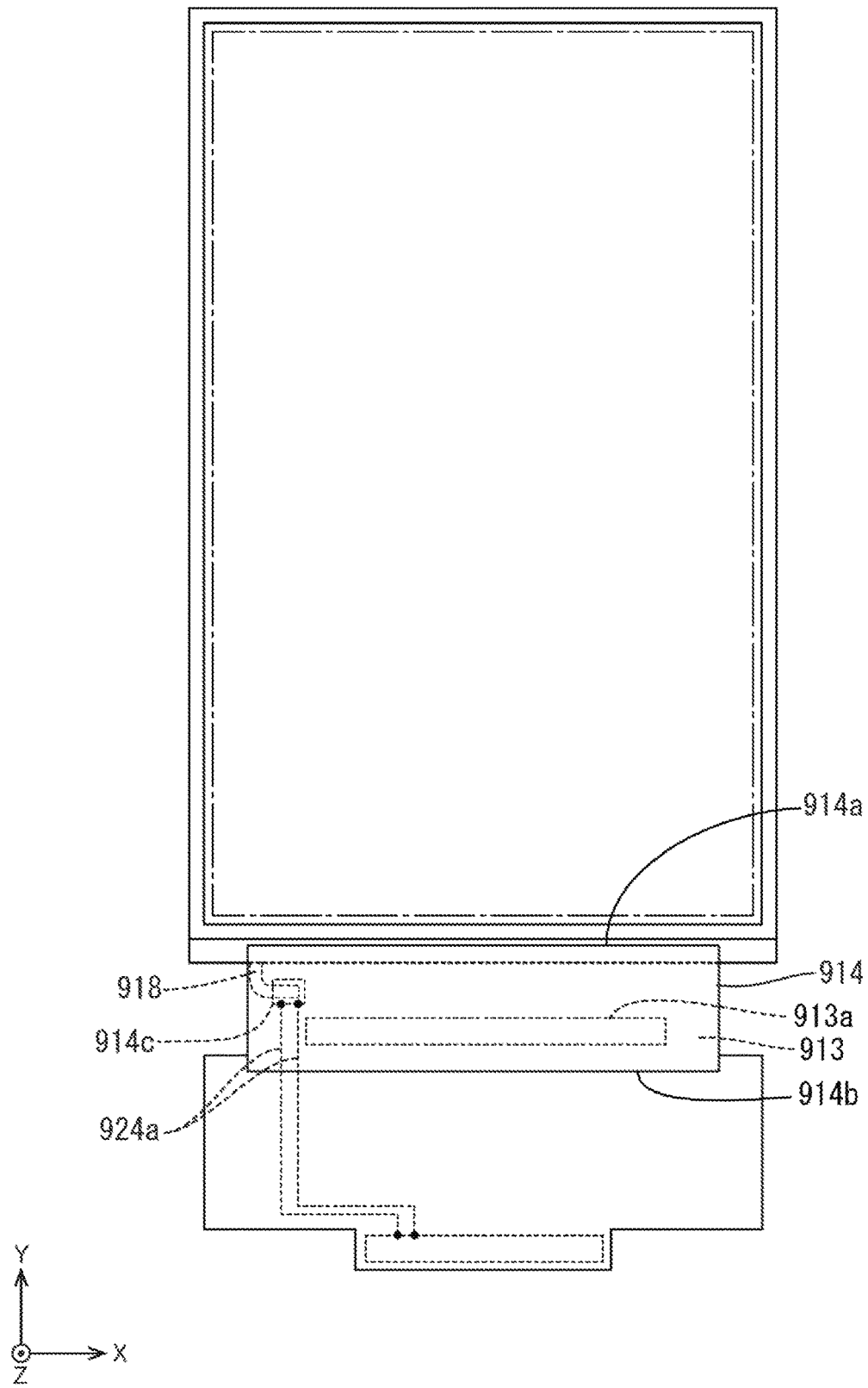
FIG. 5 is a rough plan view illustrating the connecting constitution of the liquid crystal panel, the flexible substrate for the liquid crystal panel, the LED substrate, the signal-transmission substrate and the driving component according to Modification example 1 of Embodiment 1.

A modification example 1 of First embodiment will be described with reference to FIG. 5. In this modification example 1, a dimension shape of a driver 913 mounted in a flexible substrate 914 for the liquid crystal panel differs from the driver 13 according to First embodiment. Note that in the following descriptions, repeated descriptions will be omitted with respect to the same structures, operations and effects as the above-mentioned First embodiment (assumed in the same way also with the descriptions on and after Modification example 2 of First embodiment, and Second embodiment).

In the above-mentioned First embodiment, the driver 13 has been formed in a long length up to the length which is approximately equal to the length dimension in the long side direction of the flexible substrate 14 for the liquid crystal panel. Then, although the example where the driver 13 extends up to the edge part of both the short side sides, and the soldering pad 14*c* for the LED substrate is arranged so as to be opposed to the first end edge 13*a* of the driver 13 in the flexible substrate 14 for the liquid crystal panel has been illustrated, it is not limited to this. For example, in the present modification example, the driver 913 is made to be formed in a short length rather than the driver 13, and as illustrated in FIG. 5, a first end edge 913*a* of the driver 913 is made to be configured not to extend up to the position opposed to a soldering pad 914*c* for the LED substrate in the flexible substrate 914 for the liquid crystal panel. In the present modification example, a wiring 924*a* prolonged to a second side edge 914*b* from the soldering pads 914*c* for an LED substrate can be formed more linearly in the flexible substrate 914 for the liquid crystal panel. Also in the present modification example, by the soldering pads 914*c* for the LED substrate being provided at the position close to a first side edge 914*a* rather than the first end edge 913*a* in the flexible substrate 914 for the liquid crystal panel, the external form interference of the LED substrate 918 with the driver 913 is assumed to be able to be avoided surely.

Modification Example 2 of First Embodiment

Figure 6:
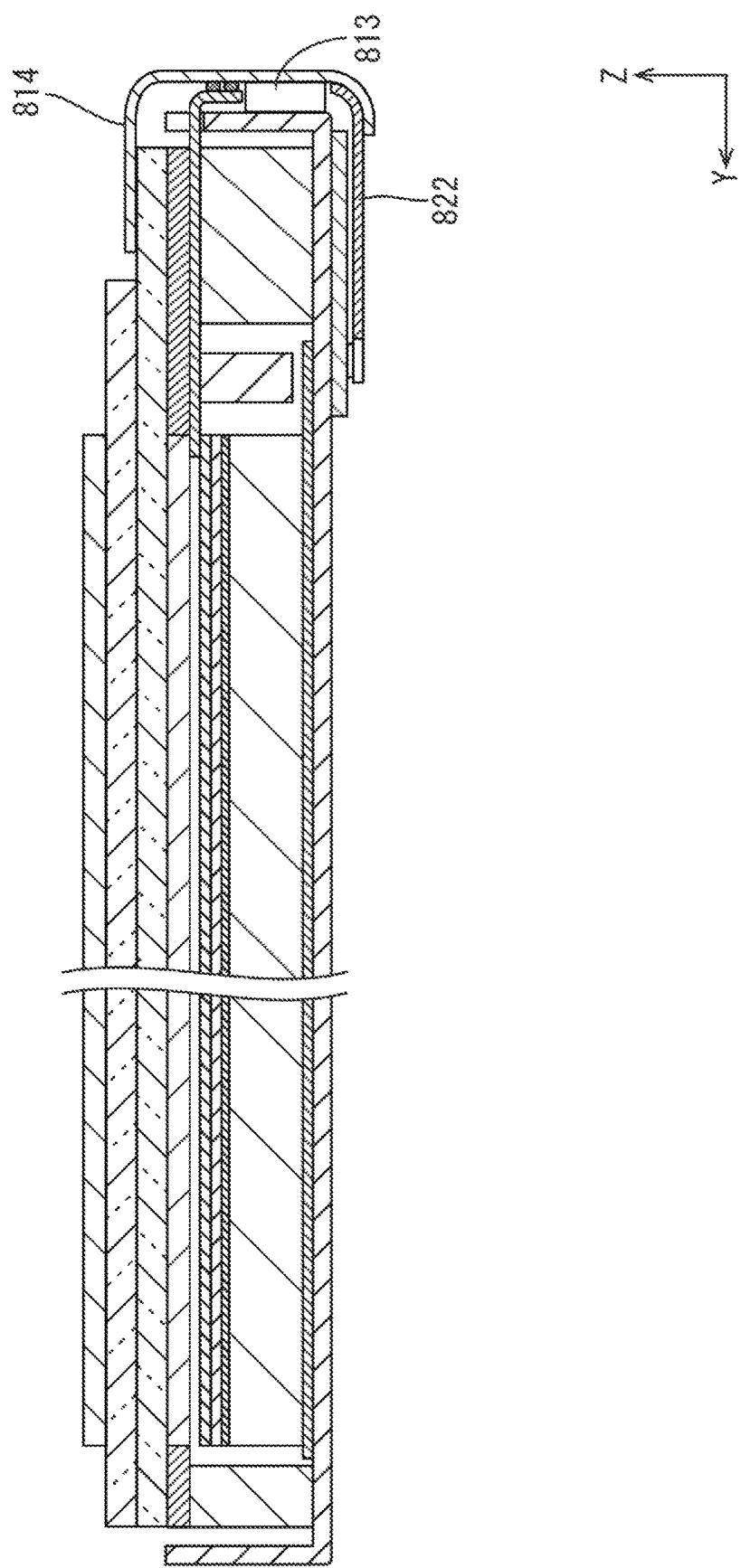
FIG. 6 is a rough sectional view illustrating the connecting constitution of the flexible substrate for the liquid crystal panel and LED substrate in the state of being bent and arranged, with the liquid crystal panel, the signal-transmission substrate and the driving component according to Modification example 2 of Embodiment 1.

A further modification example 2 of First embodiment will be described with reference to FIG. 6. In this modification example 2, a dimension and an arrangement of a flexible substrate 814 for the liquid crystal panel differ from First embodiment.

In the above-mentioned First embodiment, an example has been illustrated where the length dimension of the short side of the flexible substrate 14 for the liquid crystal panel, when this is bent and arranged, is configured to reach the back side face of the bottom plate part 15a of the chassis 15 over the one end face of the array substrate 11b and the plate surface of one side plate part 15b of the chassis 15 from the one end part of the surface of the array substrate 11b of the liquid crystal panel 11, and the driver 13 mounted in the flexible substrate 14 for the liquid crystal panel is stored so as to be opposed to the back side face of the bottom plate part 15a, and however, it is not limited to this. For example, as illustrated in FIG. 6, a length dimension of the short side of the flexible substrate 814 for the liquid crystal panel, when this is bent and arranged, may be configured to be a length reaching the plate surface of one side plate part 15b of the chassis 15 over the one end face of the array substrate 11b from the one end part of the surface of the array substrate 11b of the liquid crystal panel 11, and the driver 813 mounted in the flexible substrate 814 for the liquid crystal panel may be stored so as to be opposed to the plate surface of the side plate part 15b. In the present modification example, a signal-transmission substrate 822 assumed to be the same flexible substrate as the signal-transmission substrate 22 according to First embodiment is bent suitably to be connected with control circuit board CTR. According to the present modification example, while suppressing increase in the thickness of the liquid crystal display device 10, it is possible to reduce a frame width. Furthermore, according to the present modification example, a length dimension of the short side of the flexible substrate 814 for the liquid crystal panel can be made comparatively small.

Second Embodiments

Figure 7:
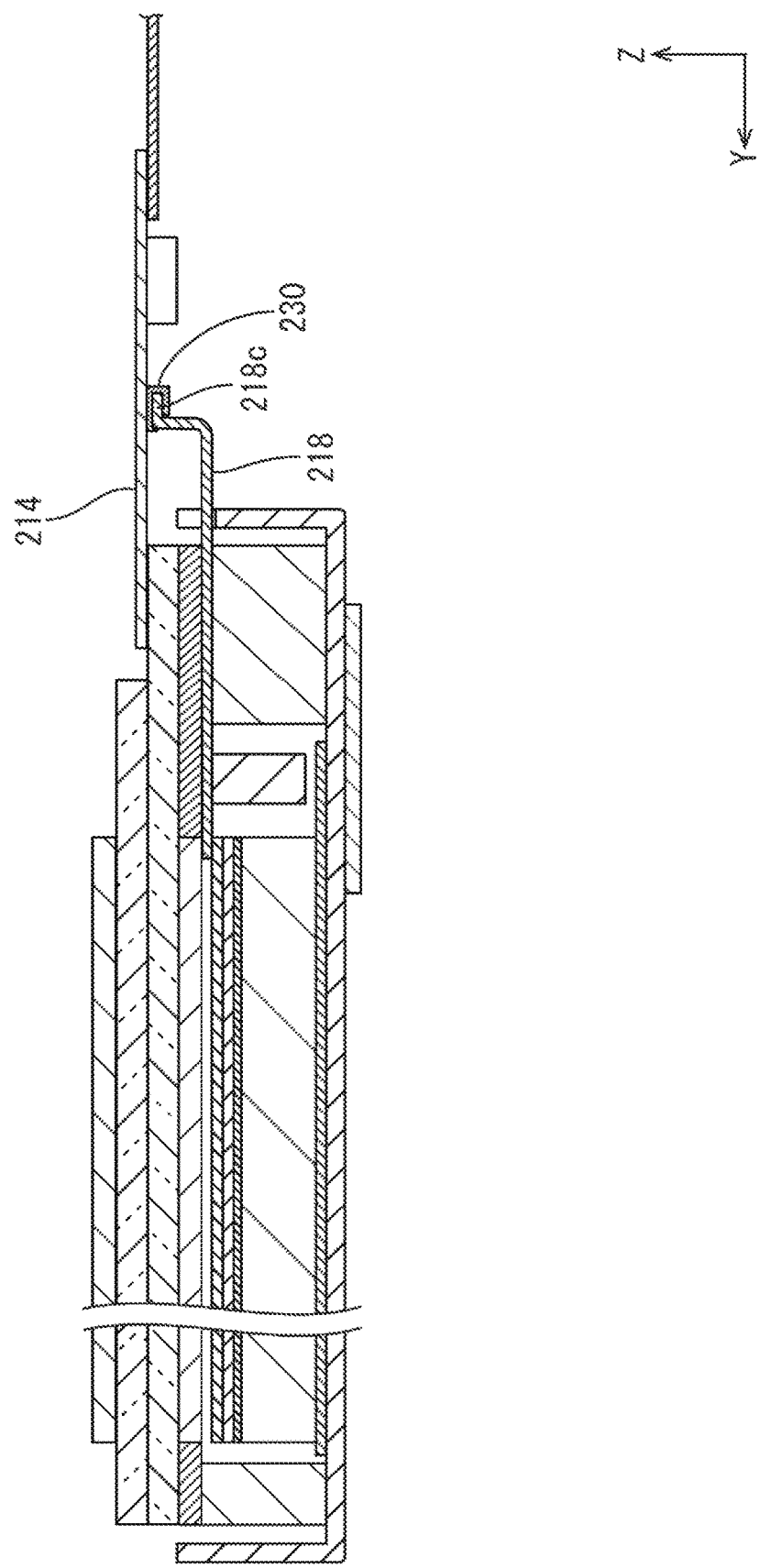
FIG. 7 is a rough sectional view illustrating the connecting constitution of the liquid crystal panel of the liquid crystal display device, the flexible substrate for the liquid crystal panel, the LED substrate, the signal-transmission substrate and the driving component according to Embodiment 2.

Second embodiment will be described with reference to FIG. 7. In this Second embodiment, a connection structure of a flexible substrate 214 for the liquid crystal panel with an LED substrate 218 differs as compared with the above-mentioned First embodiment.

In the flexible substrate 214 for the liquid crystal panel according to the present embodiment, a not-illustrated terminal area is formed by a circuit pattern provided in this flexible substrate 214 for the liquid crystal panel being exposed in a connecting location of a connection end 218c of an LSD substrate 218, and a ZIF (Zero Insertion Force) type connector 230 is connected. Then, the connection end 218c of the LED substrate 213 is inserted in a substrate inserting part of the connector 230, and thereafter, this is stuck by pressure by a slider cover etc., and thereby, the flexible substrate 214 for the liquid crystal panel and the LED substrate 218 are connected electrically and mechanically. Incidentally, as the ZIF type connector 230, various types such as a slide lock type in which the slider is provided in a level with the substrate insert part, a front lock type in which the slider is provided in a substrate insertion side, and a back lock type in which the slider is provided in the opposite side to the substrate insertion side, etc. can be used suitably.

According to the present embodiment, the flexible substrate 214 for the liquid crystal panel and the LSD substrate 218 can be connected easily, and it also becomes possible to remove and re-connect as necessary, in addition, by having used ZIF type one as a connector, an insertion force at the time of connecting the connection end 218c with the connector 230 is reduced, and a damage at the time of the detachment, etc. can be suppressed.

Third Embodiment

Figure 8:
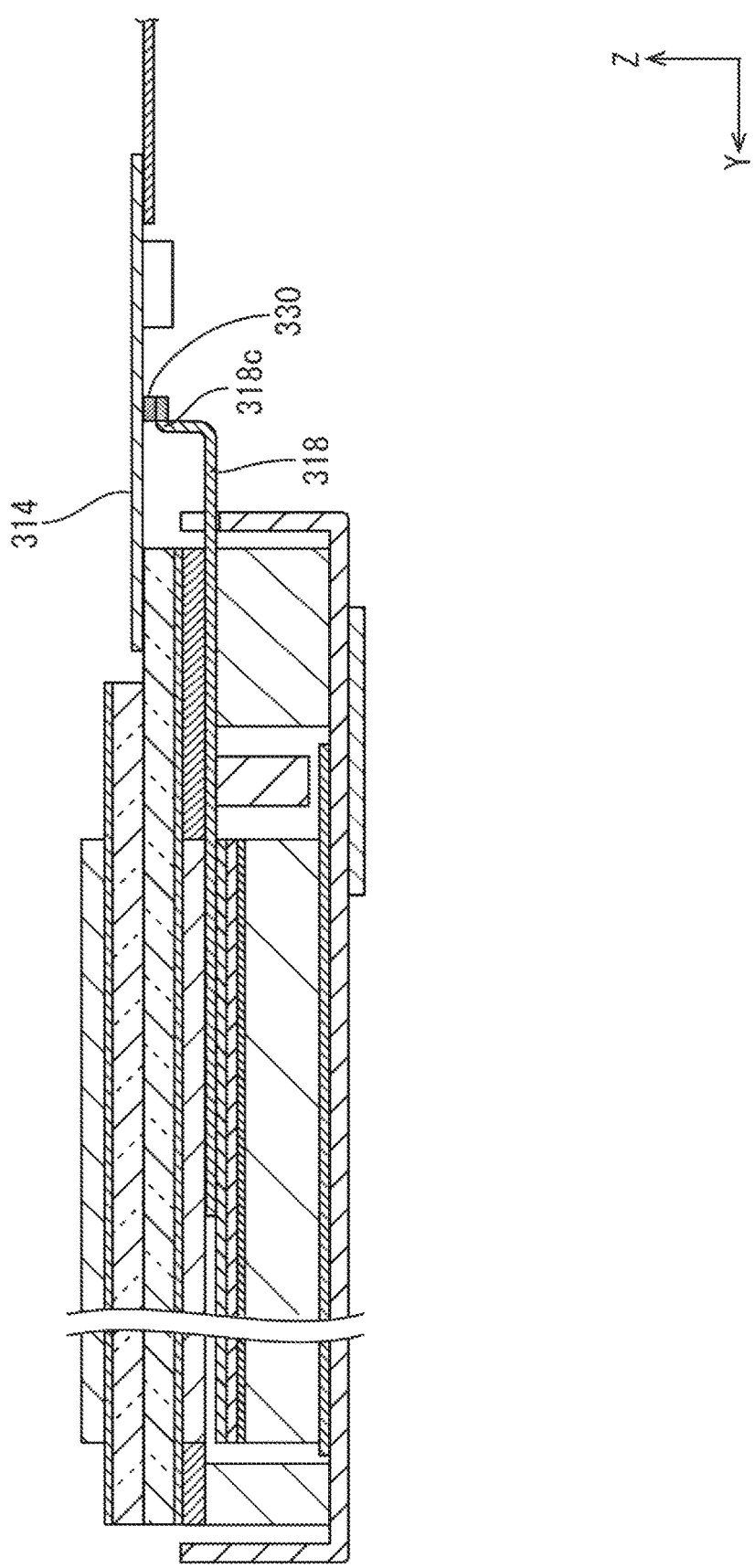
FIG. 8 is a rough sectional view illustrating the connecting constitution of the liquid crystal panel of the liquid crystal display device, the flexible substrate for the liquid crystal panel, the LED substrate, the signal-transmission substrate and the driving component according to Embodiment 3.

Third embodiment will be described with reference to FIG. 8. In also this Third embodiment, a connection structure of a flexible substrate 314 for the liquid crystal panel with an LED substrate 318 differs as compared with the above-mentioned First embodiment.

Also in a flexible substrate 314 for the liquid crystal panel according to the present embodiment, a not-illustrated terminal area is formed by a circuit pattern provided in this flexible substrate 314 for the liquid crystal panel being exposed in a connecting location of a connection end 318c of an LED substrate 318. Then, this terminal area and the connection end 318c of the LED substrate 318 are connected by B-to-B (Board to Board) type connector 330. As the result, the flexible substrate 314 for the liquid crystal panel and the LED substrate 318 are connected electrically and mechanically.

According to the present embodiment, by connecting the flexible substrate 314 for the liquid crystal panel with the LED substrate 318 using the connector 330 which is currently used widely with respect to a printed circuit board, a manufacturing cost can be suppressed.

Fourth Embodiment

Fourth embodiment will be described with reference to FIG. 9. In this Fourth embodiment, an organic EL display device provided with not the liquid crystal panel 11 but an organic EL panel 411 will be illustrated. The organic EL panel 411 is a display panel of a self-light emitting type. Therefore, the organic EL display device according to the present embodiment is not provided with an external light source (lighting device) like the back light unit 12 described in the above-mentioned First embodiment, and as a functional unit, is provided with a touch panel unit 440.

Figure 9:
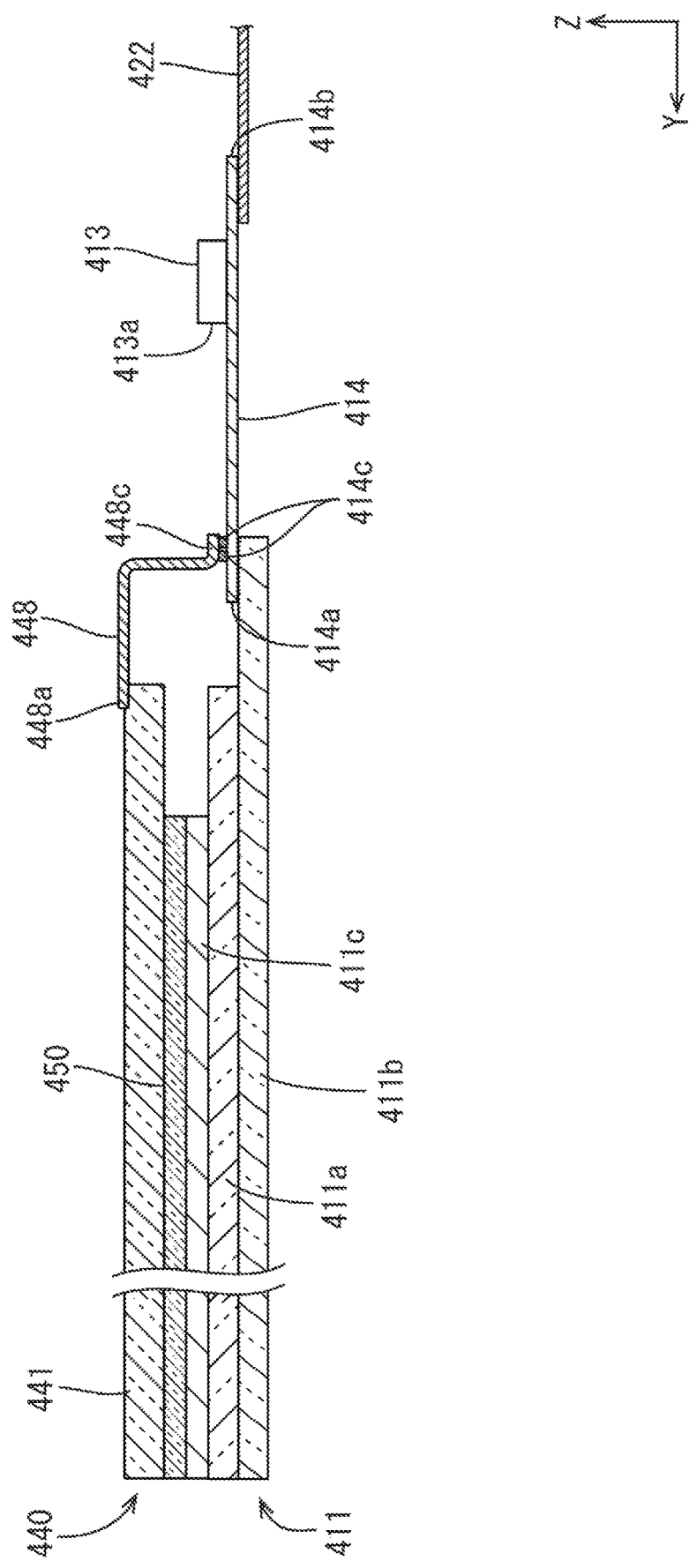
FIG. 9 is a rough sectional view illustrating the connecting constitution of an organic EL panel of an organic EL display device, the flexible substrate for the liquid crystal panel, the LED substrate, the signal-transmission substrate and the driving component according to Embodiment 4.

The organic EL panel 411 according to the present embodiment is provided with, as illustrated in FIG. 9, a CF substrate 411a and an array substrate 411b; and an organic EL layer (not-illustrated) which intervenes between both substrates 411a and 411b, and a front polarizing plate 411c is laminated on the CF substrate 411a. Then, on the surface of the front polarizing plate 411c, a touch panel film 441 is configured by being attached via an OCA sheet (Optical Clear Adhesive: optical pressure sensitive adhesive sheet) 450. Within an image display surface of the array substrate 411b of the organic EL panel 411, a first side edge 414a of a flexible substrate 414 (equivalent to the first flexible substrate) for the organic EL panel is connected to the end which is not overlapped with the CF substrate 411a. On the surface of the flexible substrate 414 for the organic EL panel, a driver 413 for driving the organic EL is mounted so as to extend along the first side edge 414a, and a second side edge 414b which is opposed to the first side edge 414a is connected to a signal-transmission substrate 422. Hereinafter, among the end edges of the driver 413, the end edge arranged in the first side edge 414a side of the flexible substrate 414 for the organic EL panel is assumed as a first end edge 413a.

In the present embodiment, the touch panel film 441 and the flexible substrate 414 for the organic EL panel are connected by a touch panel substrate (second flexible substrate) 448. The touch panel substrate 448 is provided with a base material where a synthetic resin material which is made from an insulating material and has flexibility is formed in a film shape (sheet shape), and the plate surface thereof is arranged so as to be parallel to each plate surface of the organic EL panel 411 and the touch panel film 441, etc. As for the touch panel substrate 448, one end 448a of the back side face thereof is connected to the end of the touch panel film 441, and the other end 448c is connected to a position close to the first side edge 414a of the flexible substrate 414 for the organic EL panel. As the result, information from an organic EL touch panel is transmitted to the control circuit board and at the same time, a signal from the same control circuit board is received and driving of the touch panel unit 440 is assumed to be able to be controlled. In the present embodiment, in the surface of the flexible substrate 414 for the organic EL panel, a soldering pad 414c for the touch panel substrate is formed at a position close to the first side edge 414a rather than the first end edge 413a of the driver 413 mounted on this, and by the end 448c of the touch panel substrate 448 being soldered to this soldering pad 414c for touch panel substrate, both substrates have become to be connected.

As for the touch panel unit 440, signals transmitted to this are large in number, and as the result, wirings are also large in number. Therefore, the flexible substrate 414 for the organic EL panel becomes large in a width which is orthogonal to a wiring connecting direction, and it is easy to cause an external form interference with the driver 413. According to the present embodiment, this technology is effectively utilizable in particular in such a configuration as this.

Fifth Embodiment

Fifth embodiment will be described with reference to FIG. 10. As for a liquid crystal display device 510 according to this Fifth embodiment, a shape of a liquid crystal panel 511 is different from that of the liquid crystal panel 11 as compared with the liquid crystal display device 10 according to First embodiment.

Figure 10:
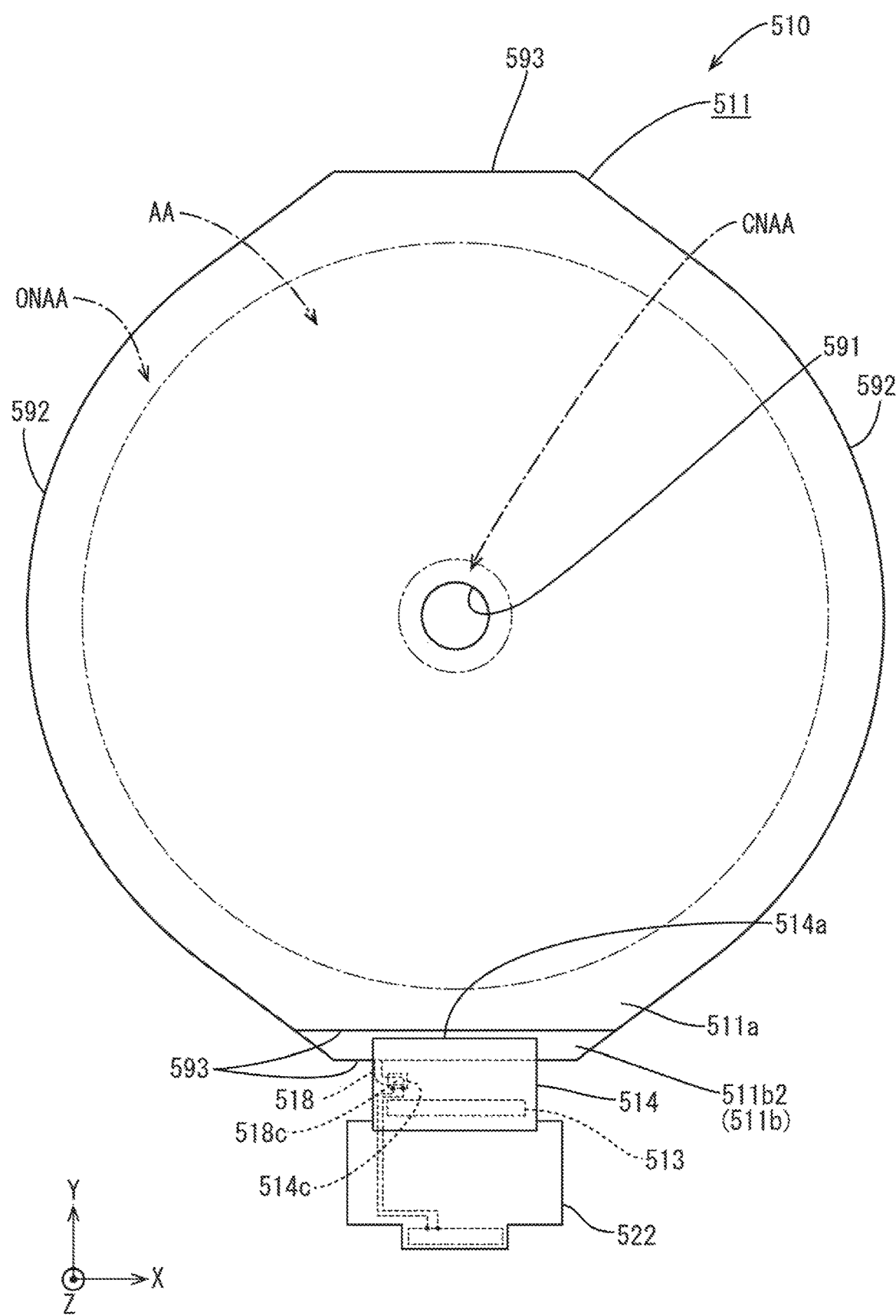
FIG. 10 is a rough plan view illustrating the connecting constitution of the liquid crystal panel of the liquid crystal display device, the flexible substrate for the liquid crystal panel (first flexible substrate), the LED substrate (second

A liquid crystal display device 510 according to the present embodiment, as illustrated in FIG. 10, has a liquid crystal panel (display panel) 511 which makes a disk shape as a whole. Although the liquid crystal display device 510 according to the present embodiment is preferred to be used in a wearable terminal (not shown) such as a smart watch, for example, it is not necessarily limited to that. In addition, although the other members of the liquid crystal display device 510 are assumed to have shapes in accordance with the shape of the liquid crystal panel 511, basic configurations are the same as those of the liquid crystal display device 10.

The liquid crystal panel 511, as illustrated in FIG. 10, has an external form making an approximately circle shape in a plan view, and has a panel through hole 591 of a circle-shape in a plan view formed at the center by penetration along a board thickness direction (Z axial direction), and makes an approximately annular shape (approximately doughnut shape) as a whole. In detail, as for the external form of the liquid crystal panel 511, a large percentage thereof is assumed to be a curved external part 592 which makes a circular arc shape in a plan view, and in contrast to that, a part thereof is assumed to a linear external part 593 which makes a linear shape in a plan view, in FIG. 10, an extending direction of the linear external part 593 of the liquid crystal panel 511 is illustrated so as to be in agreement with the X axial direction, and the outline of the display area AA in which an image is displayed is illustrated with a dashed dotted line. As for the display area AA, a plane shape makes an annular shape. The display area AA has a center side non-display area CNAA which is in the inner circumference side and is located at the center; and an outer periphery side non-display area ONAA arranged in the outer periphery side of the display area AA, and an image is not displayed on these of the center side non display areas CNAA and the outer periphery side non display area ONAA.

As illustrated in FIG. 10, among a pair of substrates 511a and 511b which constitute the liquid crystal panel 511, the array substrate 511b arranged on the back side is stuck in a state where one (upper side in FIG. 10) linear external part 593 is aligned with the same linear external part 593 of the CF substrate 511a arranged in the front side. The other (lower side in FIG. 10) linear external part 593 of the array substrate 511b is arranged in a form protruded to the outside rather than the same linear external part 593 of the CF substrate 511a, and this protruded portion is assumed to be a CF substrate non-overlapping part 511b2. To this CF substrate non-overlapping part 511b2, one end part of the flexible substrate 514 for the liquid crystal panel is connected, and to the other end, the signal-transmission substrate 522 is connected. On the flexible substrate 514 for the liquid crystal panel, the driver 513 is COF (Chip-On-Film)-mounted. In addition, although not illustrated in FIG. 10, to the back side face side of the liquid crystal panel 511, the back light unit is mounted, and a connection end 518c formed in the other end of an LED substrate 518 of which one end part is connected to this is connected by soldering to a soldering pad 514c for the LED substrate formed in the back side face of the flexible substrate 514 for the liquid crystal panel.

In the present embodiment, the flexible substrate 514 for the liquid crystal pane and the LED substrate 518, along the linear external part 583 of the CF substrate non-overlapping part 511b2 side of the array substrate 511b, are bent and arranged in the back side face side of the liquid crystal panel 511. In this case, by being configured as mentioned above, while it is possible to reduce a frame width of the liquid crystal display device 510, the external form interference of the driver 513 with the LED substrate 518 has become to be able to be avoided, in this way, according to the present embodiment, it is possible to reduce a frame width by applying this technology effectively also in the liquid crystal display device in which the display panel is approximately circle-shaped.

Other Embodiments

The present technology is not limited to the embodiments described with the above-mentioned descriptions and drawings, and the following embodiments are also included in this technical scope, for example.

(1) In an organic EL display device provided with the touch panel unit described in Fourth embodiment, connection between a touch panel substrate and a flexible substrate for an organic EL panel can also be made by the various connectors which have been described with respect to connection between an LED substrate and a flexible substrate for a liquid crystal panel in the Second embodiment and Third embodiment. Alternatively, in the same way as descriptions with respect to connection of a flexible substrate for a liquid crystal panel with a liquid crystal panel or a signal-transmission substrate, connection may be carried out by an anisotropic conductive material. To the touch panel unit, signals transmitted are large in number, and as the result, wirings become also large in number, and as the result, the anisotropic conductive material can be used preferably.

(2) A touch panel unit as illustrated in Fourth embodiment may be combined with configurations of above-mentioned First embodiment to Third embodiment. In addition, as a touch panel unit, although in Fourth embodiment an out-cell type in which this is exteriorly installed to a display panel has been illustrated, an in-sell type in which this function is incorporated in the inside of the display panel may be acceptable. Incidentally, when this technology is applied to a display device provided with both the functional units of a back light unit and a touch panel unit, it is preferred that an LED substrate and a touch panel substrate are all connected to a position close to a first side edge rather than a first end edge of a driver in a flexible substrate for a liquid crystal panel and at the same time, both substrates are connected so as to be made to be separated to the positions close to both ends of the first side edge.

(3) Although ones of which the outline of the display panel make a rectangular form or an approximate circle shape have been illustrated in each above-mentioned embodiment, it is not limited to this. One which makes a triangle or a polygonal shape more than a pentagon, one in which a circumference of a circle or an ellipse and its chord are made to be an outline, and one which is formed by an outline including the other curve-like portion may be acceptable.

(4) Although a driver which makes a longitudinal shape along a first side edge of a first flexible substrate has been illustrated in each above-mentioned embodiment, it is also possible to use a driver which makes a square shape and a non-rectangular shape in a plan view, for example. Irrespective of the whole outline, in a display device provided with a driver having a dimension shape so as to extend along a first side edge in order to be capable of dealing with making a display image highly minute, the present technology is effectively applicable.

(5) Although ones where a first flexible substrate illustrated by a flexible substrate for a liquid crystal panels or a flexible substrate for an organic EL panel, and a second flexible substrate illustrated by an LED substrate or a flexible substrate for a touch panel are provided with a substrate made from an insulating resin material having flexibility have been illustrated in each above-mentioned embodiment, it is not limited to this. For example, one in which, while an insulating layer is formed suitably on a metal thin film, circuit patterns are wired and formed is made to be possible.

(6) Although a case where each of a flexible substrate and a driver is mounted in a driver mounting substrate via anisotropic conductive materials separated from each other has been illustrated in each above-mentioned embodiment, a case where each of a flexible substrate and a driver is mounted in a driver mounting substrate via a series of anisotropic conductive materials integrally formed may also be acceptable. In this way, process working hours for mounting anisotropic conductive materials can be shortened.

(7) Although a case where a signal-transmission substrate is made to be a flexible substrate having flexibility has been illustrated in each above-mentioned embodiment, as illustrated in FIG. 4, for example, a signal-transmission substrate may be made as a rigid substrate when the signal-transmission substrate is configured so as to be unnecessary to be made bent. In some cases, it is also possible to make a signal-transmission substrate as a control circuit board.

(8) Although a case where a technology according to the present Description is applied to a liquid crystal panel classified into a small type or a middle and small type has been illustrated in the above-mentioned embodiment, the present technology is applicable also to a display device classified into a medium size or a large size (super large size) where screen sizes are 20 inches to 90 inches.

(9) Although a case where a technology according to a liquid crystal panel or an organic SL panel is applied as a display panel has been illustrated in each above-mentioned embodiment, the present technology is applicable to other types of display panels (PDP (plasma display panel), EPD (electrophoresis display panel), MEMS (Micro Electro Mechanical Systems) display panel, etc.), etc.

EXPLANATION OF SYMBOLS

10: liquid crystal display device (display device)
11: liquid crystal panel (display panel)
11a: CF substrate (color filter substrate, counter substrate)
11b: array substrate (active matrix substrate, element substrate)
11b1: CF substrate overlapped part
11b2: CF substrate non-overlapping part
12: back light unit (functional unit)
13, 813, 913: driver (driving component)
13a, 913a: first end edge
14, 214, 314, 814, 914: flexible substrate for liquid crystal panel (first flexible substrate)
14a, 914a: first side edge
14b, 914b: second side edge
14c, 914c: soldering pad for LED substrate
15: chassis (casing, cabinet)
16: frame
17: LED (light emitting diode)
18, 218, 318, 918: LED substrate (feeding member for lighting device, light source substrate, second flexible substrate)
18a: LED mounted part
18b: Drawing wiring part
18c, 218c, 318c: connection end
19: light guide plate
20: optical sheet (optical member)
21: reflective sheet (reflecting member)
22, 822, 922: signal-transmission substrate
24: LED wiring
CTR: control circuit board (control board)
AA: display area (active area)
NAA: non-display area (non-active area)

The invention claimed is:
1. A display device comprising:
a display panel configured to display an image;
a functional unit internally installed or exteriorly installed in the display panel;
a first flexible substrate connected to the display panel in one end part thereof and have flexibility;
a signal-transmission substrate connected to another end part opposite to the one end part of the first flexible substrate and configured to transmit a signal for driving the display panel and the functional unit to the first flexible substrate;

a driving component mounted on the first flexible substrate and configured to process and supply a signal from the signal-transmission substrate to the display panel to drive the display panel and display an image; and a second flexible substrate having flexibility, the second flexible substrate having one end part that is connected to the functional unit and another end part opposite to the one end part, the other end part of the second flexible substrate being connected to a part of the first flexible substrate, the part being closer to the display panel than a display panel side end edge of the driving component that is mounted on the first flexible substrate.

2. The display device according to claim 1 wherein the display panel is divided into a display area displaying an image and a non-display area surrounding the display area, the one end part of the first flexible substrate is connected to the non-display area, and the driving component is longitudinally arranged along the one end part of the first flexible substrate, and at least a part of the display panel side end edge thereof is opposed to at least a part of a connection section between the first flexible substrate and the second flexible substrate.

3. The display device according to claim 1, wherein the first flexible substrate is connected to a display surface side of the display panel, and the first flexible substrate has a connection surface side connected to the display panel and the driving component is mounted on and the second flexible substrate is connected to the connection surface side of the first flexible substrate.

4. The display device according to claim 1, wherein the first flexible substrate is curved such that the driving component is arranged so as to be opposed to a plate surface of the display panel opposite to a display surface thereof.

5. The display device according to claim 1, wherein the first flexible substrate is curved such that the driving component is arranged so as to be opposed to an end face of the display panel with respect to a thickness direction thereof.

6. The display device according to claim 1, wherein the display panel is a liquid crystal panel including liquid crystals as a display element, and the functional unit is a back light unit.

7. The display device according to claim 1, wherein the functional unit is a touch panel unit.

* * * * *